March 26, 1935.  T. A. ABBOTT ET AL  1,995,878
METER CASING
Filed Oct. 13, 1933
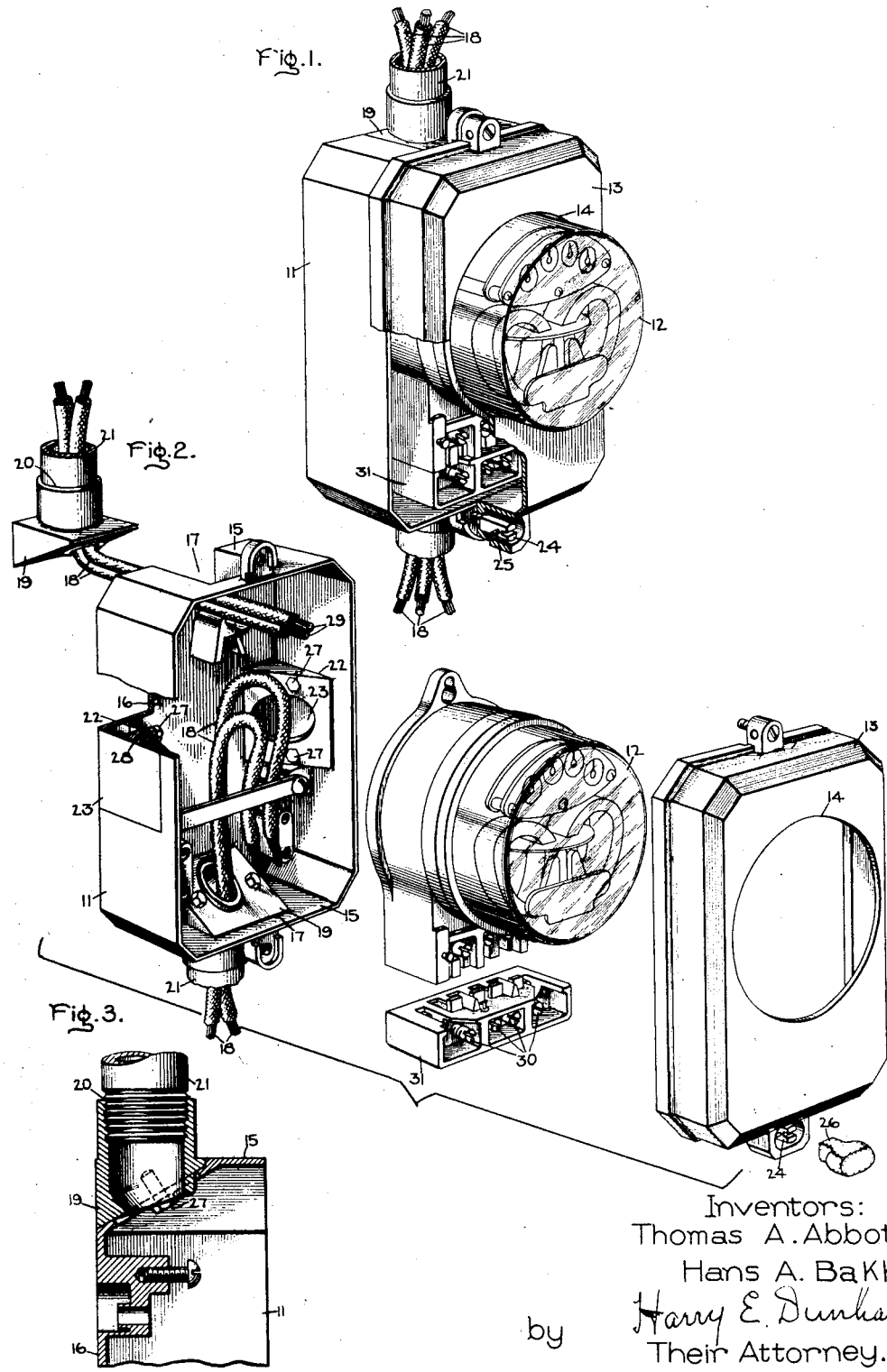
Inventors:
Thomas A. Abbott,
Hans A. Bakke
by Harry E. Dunham
Their Attorney.

Patented Mar. 26, 1935

1,995,878

UNITED STATES PATENT OFFICE 1,995,878

METER CASING

Thomas A. Abbott, Marblehead, and Hans A. Bakke, Swampscott, Mass., assignors to General Electric Company, a corporation of New York Application October 13, 1933, Serial No. 693,527

5 Claims. (Cl. 247—2)

Our invention relates to casings for electrical instruments and other devices and has for its principal object the provision of an improved arrangement for removably attaching a casing for an electrical device to conductor protective conduit containing conductors to be connected to the electrical device enclosed in the casing.

It is also an object of our invention to provide a casing in which conductors may be lead into the casing through conduit from one or more directions and the casing may be detached from the conduit without pulling the conductors out of the conduit or causing the conductor extending through the conduit to be sheared off by the edge of the casing. Other and further objects and advantages will become apparent as the description proceeds.

In accordance with our invention in its preferred form, we provide a casing for an electrical device with removable nipples for attachment to conductor protective conduit instead of making the nipples for receiving the conduit integral with the casing. This construction permits removing the casing without unscrewing or otherwise unfastening electrical conduit which may, therefore, be left permanently installed. The openings in the casing which are occupied by the removable nipples are preferably formed by recessing a portion of the back walls as well as the end walls of the casing in order that ample clearance will be left for the conductors when the casing is removed and the danger of shearing off the conductor with the edge of the casing is overcome.

The features of our invention which we believe to be novel and patentable will be pointed out in the claims appended hereto. A better understanding of our invention, however, may be obtained by referring to the following description taken in connection with the accompanying drawing in which Fig. 1 represents in perspective, with a portion thereof broken away, an embodiment of our invention taking the form of a meter protective casing; Fig. 2 represents an exploded view of the apparatus shown in Fig. 1; and Fig. 3 is a detailed view in section of a portion of the apparatus shown in Figs. 1 and 2.

Although we have represented our invention as carried out in connection with meter protective casings, it will be understood that our invention is not limited thereto. Referring to the drawing in which like reference characters designate like parts throughout, we have shown a casing comprising a box 11 for receiving a meter 12 and a cover 13 for the box 11 having a circular opening 14 permitting a portion of the meter 12 to project. The end walls 15 and the back wall 16 are recessed at 17 to provide openings for the reception of removable covers or nipples 19 having openings 20 for the reception of electrical conduit 21, containing conductors 18 to be connected to the meter 12. The conduit 21 and the covers 19 may be joined in any desired manner, e. g. by means of a threaded connection. It will be apparent that the same meter protective casing may be adapted to take different sizes of conduit by utilizing different removable nipples 19, adapted to the size of conduit required. Inasmuch as there are now several standard sizes of conduit in use with meter protective casings, primarily ¾″, 1″, and 1¼″, it is obvious that a considerable saving in the cost of manufacturing and stocking casings may be made by employing removable nipples to permit the use of a single casing design for the various sizes of conduit.

Although we have shown a meter casing in which the electrical conductors 18 enter and leave through openings in the ends of the meter casing, it will be understood that we are not limited to this exact arrangement. If desired, the conductors 18 may enter and leave through a single opening or, if desired, one or both openings may be placed at the sides of the casing instead of the ends. For example, if it be desired that one or both of the conductor pairs 18 should enter the casing at the side instead of at the end, one or both of the movable covers 19 would be placed in one of the openings 22 at the side of the casing 11 instead of in the openings 17. In order that the casing will be weatherproof and access to the interior will be prevented, plain covers 23 are provided for whichever of the openings 17 or 22 are not to be used for the entry of electrical conductors 18. The provision for the attachment of conduit at either the sides or the ends facilitates compactly mounting a group of encased meters in a bank, where it is necessary to mount a plurality of meters together on a wall.

In order to prevent access to the interior of the casing by unauthorized persons, the cover 13 is preferably sealed to the box 11. If desired, a seal of the type disclosed in the copending application of Thomas A. Abbott, filed July 21, 1933 Serial No. 681,508, may be utilized. In this type of seal, a screw 24 for fastening the cover 13 to the box 11 is provided with a lateral pin 25 pressed outwardly by a spring, not shown, which prevents removal of a frangible sealing cap 26 which is permitted to be slipped in place by pressing the pin 25 inwardly after the cover 13 has been screwed down to the box 11. In order to prevent unauthorized persons from gaining access to the interior of the casing 11 through the covers 19 or 23, these covers are secured to the walls of the casing 11 from the inside. The cap screws 27 are inserted through openings in the walls of the casing 11 and cooperate with threaded openings 28 in the covers 19 and 23. The covers 19 and 23 are obviously secured in place by means of the cap screws 27 before the meter cover 13 is sealed to the box 11 by means of the screw 24 and sealing cap 26.

It will be apparent that, if it is desired to remove the casing 11 from the premises where the conduit 21 and the covers 19 are permanently installed, this may be done by disconnecting the ends 29 of the conductors 18 from the meter 12 by loosening the terminal screws 30 of the meter 12. The ends 29 of the conductors 18 are then permitted to slip out of conductor receiving openings (not shown) in the terminal block 31 and are slid through the openings 17 as the casing 11 is pulled forward. Inasmuch as the back wall 16 of the casing 11 is recessed where the conductor 18 enters the casing 11, sufficient clearance is allowed for the conductor 18 so that it will not be sheared off or need not be bent at too sharp an angle. This arrangement, therefore, makes it unnecessary to pull the conductor 18 back through the conduit 21 so that the ends 29 will be drawn into the conduit 21 in order to clear the edge of the opening in the casing.

In accordance with the provisions of the patent statutes, we have described the principle of operation of our invention together with the apparatus which we now consider to represent the best embodiment thereof, but we desire to have it understood that the apparatus shown is only illustrative and that the invention may be carried out by other means.

What we claim as new and desire to secure by Letters Patent of the United States, is:

1. In combination, a closed-back casing for an electrical device having a conductor-receiving opening therein and a removable cover for said conductor-receiving opening, said removable cover having an opening therein adapted to receive conductor protective conduit in fastened relation thereby permitting said casing to be installed and removed without disturbing the connection between said cover and electrical conduit fastened thereto.

2. An electrical instrument casing comprising an instrument-receiving box having a conductor-receiving opening and an instrument-receiving opening, removable covers for said openings, means for sealing the cover for said instrument-receiving opening to said box, and means in the interior of said box for removably securing the cover for said conductor-receiving opening to said box thereby preventing access to the interior of said casing when sealed, said removable cover for the conductor-receiving opening having an opening therein adapted to receive conductor protective conduit in fastened relation thereby permitting said casing to be installed and removed without disturbing the connection between said cover and electrical conduit fastened thereto.

3. In combination, a casing for an electrical device, said casing having a conductor-receiving opening therein, and a removable cover therefor, said casing having a back wall and side walls integral therewith, said back wall and one of said side walls being recessed from their common edge to form said opening, said cover having an opening therein adapted to receive conductor protective conduit in fastened relation thereby permitting said casing to be installed and removed without disturbing the connection between said removable cover and conduit connected thereto, and without shearing off conductors extending through said cover in said casing.

4. In combination, a casing for an electrical device, said casing having a pair of conductor receiving openings therein, and a pair of removable covers therefor, said casing having a back wall and side walls integral therewith, said back wall and two of said side walls being recessed from their common edges to form said openings, said removable covers having surfaces at angles to each other closing the recesses in the walls of said casing and each having an opening therein adapted to receive in fastened relation conductor protective conduit thereby permitting said casing to be installed and removed with said removable covers fastened to permanently installed conduit without shearing off conductors extending through said cover into said instrument casing.

5. In combination, a casing for an electrical device, said casing having a pair of conductor-receiving openings therein, and a pair of removable covers therefor, said casing having a back wall and side walls integral therewith, said back wall and two of said side walls being recessed from their common edges to form said openings, said removable covers having surfaces at angles to each other closing the recesses in the walls of said casing and one of said covers having an opening therein adapted to receive conductor protective conduit in fastened relation, thereby permitting said instrument casing to be pulled directly forward from said conduit-receiving cover without shearing off conductors extending through said cover into said casing.

THOMAS A. ABBOTT.
HANS A. BAKKE.